March 13, 1956     J. R. HERZ     2,737,724

GAUGE FOR FEMORAL TROCHANTERIC OSTEOTOMY

Filed Oct. 11, 1950     5 Sheets-Sheet 1

INVENTOR.
James R. Herz
BY Thos. E. Scofield
ATTORNEY.

March 13, 1956  J. R. HERZ  2,737,724
GAUGE FOR FEMORAL TROCHANTERIC OSTEOTOMY
Filed Oct. 11, 1950  5 Sheets-Sheet 2
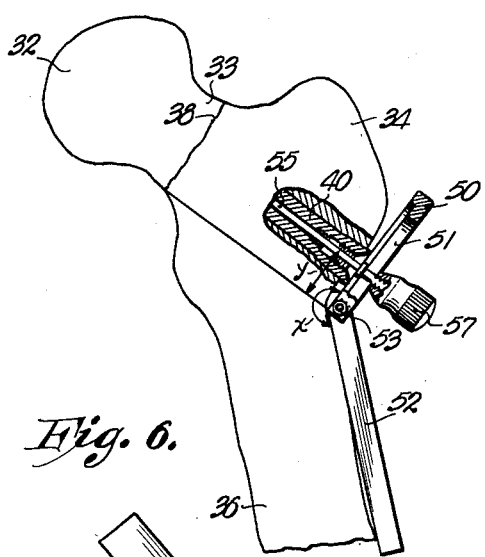
Fig. 6.
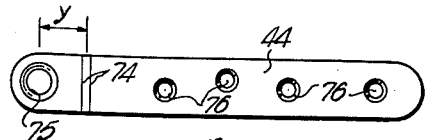
Fig. 7.
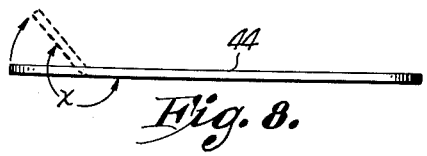
Fig. 8.
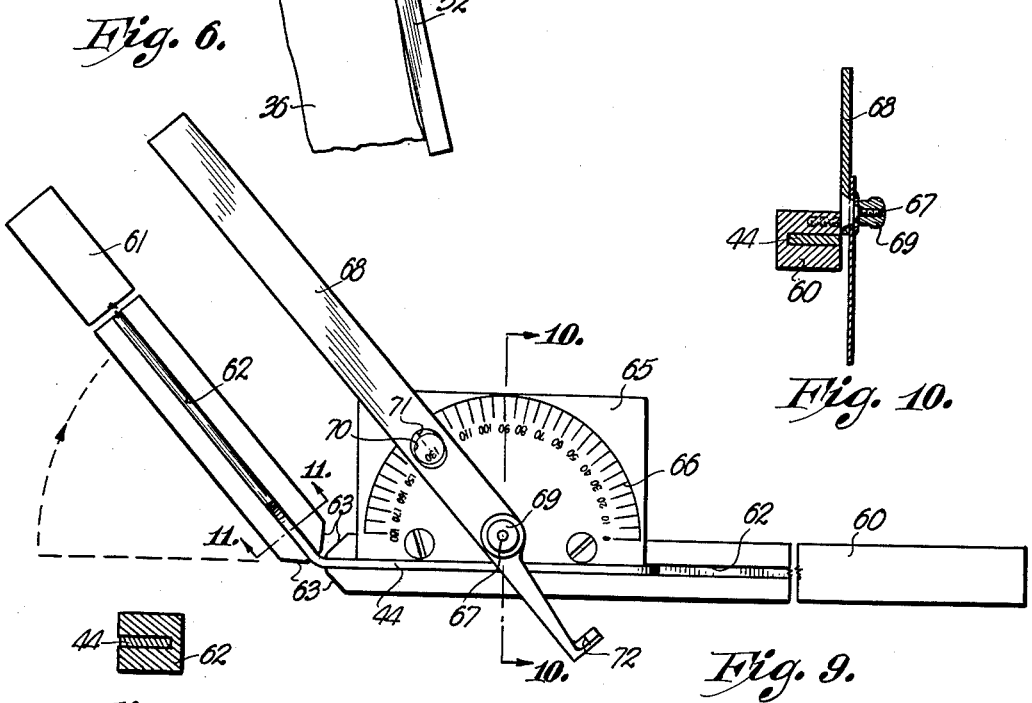
Fig. 10.
Fig. 9.
Fig. 11.
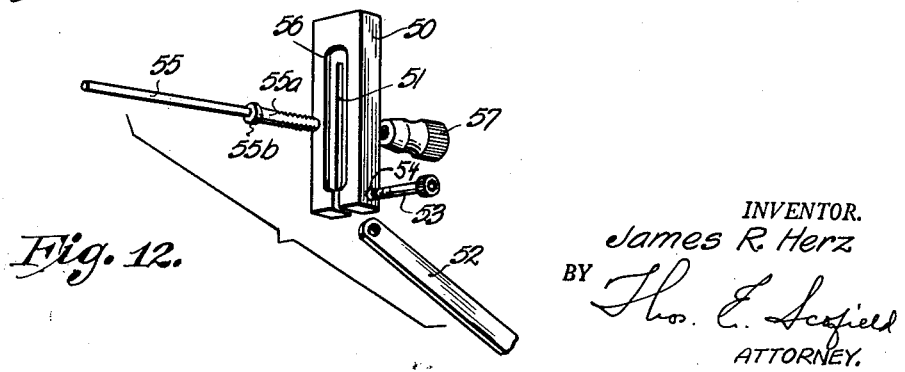
Fig. 12.
INVENTOR.
James R. Herz
BY Thos. E. Scofield
ATTORNEY.

March 13, 1956   J. R. HERZ   2,737,724
GAUGE FOR FEMORAL TROCHANTERIC OSTEOTOMY
Filed Oct. 11, 1950   5 Sheets-Sheet 3
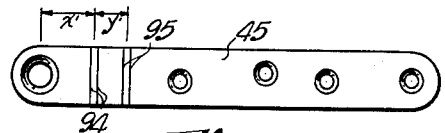
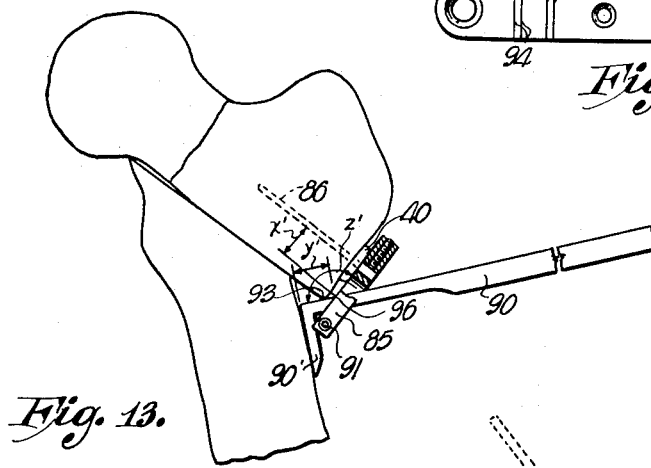
INVENTOR.
James R. Herz
BY
Thos. E. Scofield
ATTORNEY.

March 13, 1956  J. R. HERZ  2,737,724
GAUGE FOR FEMORAL TROCHANTERIC OSTEOTOMY
Filed Oct. 11, 1950  5 Sheets-Sheet 4

INVENTOR.
James K. Herz
BY
ATTORNEY.

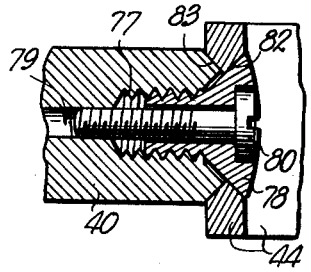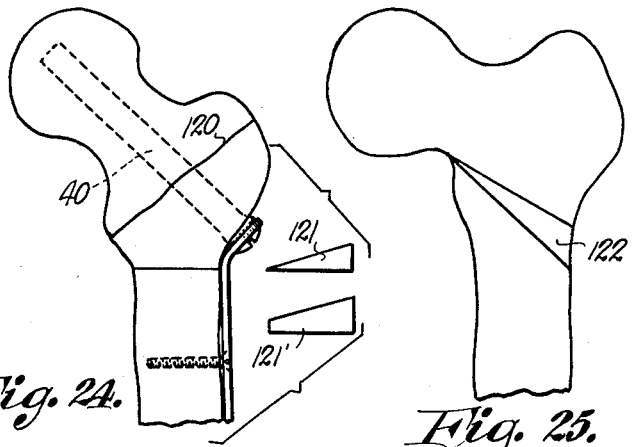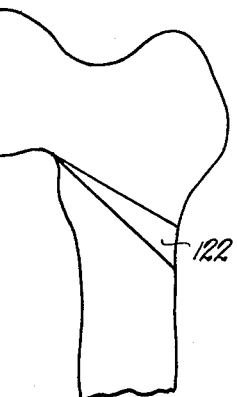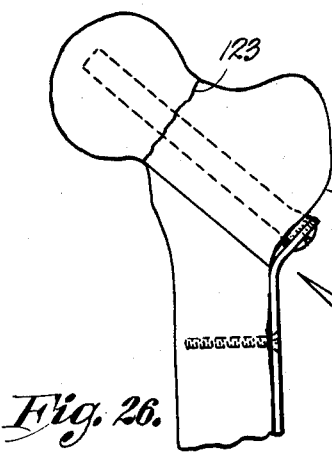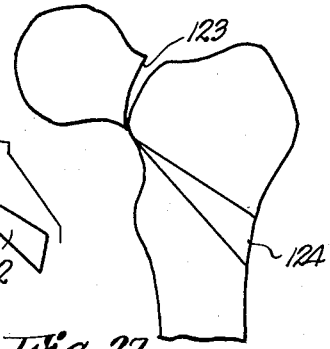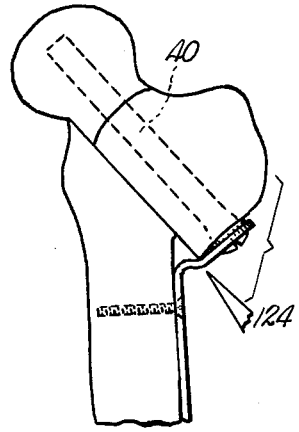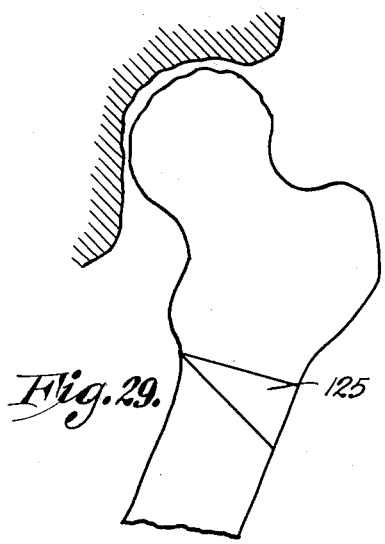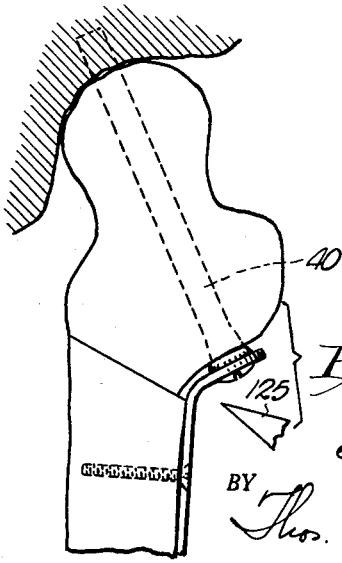

United States Patent Office 2,737,724
Patented Mar. 13, 1956

2,737,724

GAUGE FOR FEMORAL TROCHANTERIC OSTEOTOMY

James R. Herz, Reno, Nev.

Application October 11, 1950, Serial No. 189,550

14 Claims. (Cl. 33—174)

The present invention relates in general to bone and joint surgery; it deals with the hip joint at the upper extremity of the femur, or thigh bone, of the human skeleton, and refers specifically to femoral trochanteric osteotomy.

By definition and association, osteotomy is an operation upon bone which involves cutting it, sometimes removing portions of it or adding portions to it, and moving the bone parts in space relative to one another. These parts must be allowed to knit in their new relationship, so it quite obviously is important in any osteotomy to provide some means for holding them fixedly in the desired position at least through the post-operative healing period and perhaps permanently.

Osteotomy in the femoral trochanteric region is not new and, as a matter of fact, its theoretical soundness has been appreciated and its importance suspected for perhaps 100 years; however, the procedure has seldom been used in practice because of the difficulty of immobilizing the bone components satisfactorily in their desired position—a difficulty which grows out of the irregular contour of the bone at the osteotomy site, and the literally infinite number of variations that there may be in the desired final disposition of the bone components. The fixation devices heretofore available are poorly tolerated by elderly individuals (in whom the majority of such operations would be done) or are inefficient, inelastic in application, and unversatile. Internal splints, for example, are rigid in construction and applicable as a rule only to one type of operation. Consequently, the major proportion of the cases amenable to femoral trochanteric osteotomy go begging, and, where the procedure is employed, the bone components ordinarily are fixed at best by inefficient means such as wire screws, nails, etc.

It is an object of the present invention, broadly speaking, to remedy the foregoing situation. More particularly it is my aim to provide a method and apparatus for effecting the internal fixation of bone components in the case of a femoral trochanteric osteotomy, which method and apparatus are characterized by such flexibility as to make them applicable to all operations in this region, regardless of the bone contour and regardless of the desired final disposition of the bone components.

To this end it is an important object of the invention to provide a method and apparatus for very rapidly and very accurately forming and fabricating an internal fixation device to conform to any bone contour and any disposition of bone components likely to be encountered in a femoral trochanteric osteotomy, whereby, in the course of the operation, the fixation device can be fashioned by or under the supervision of the operating surgeon to fit the particular situation at hand, and applied to the bone components at the osteotomy site to hold them securely in the desired position.

A feature of the invention resides in the provision and use of a gauge of novel construction for quickly and accurately analyzing and registering the relative position of the bone components after the operating surgeon has made the desired cut or cuts in the femur, and has relocated the components to achieve the desired end.

Another feature lies in the provision of novel tools which are used in conjunction with the aforementioned gauge to rapidly shape a fixation device which will accurately conform to the contour and position of the relocated bone components and which may be secured thereto quickly and easily.

According to my invention, I employ a two-part fixation device, namely, (1) a multi-flange nail adapted to be positioned axially of the femoral neck, and (2) on inter-trochanteric osteotomy plate or splint extending from the end of the nail along the side of the femoral shaft and secured thereto; a further feature resides in an improved form of connection between the nail and the plate whereby the two are easily connected to one another in the correct relationship, and, when connected, are very securely locked against any change in their relationship so that they become in effect a single permanently rigid unit.

Other objects of the invention together with the features of novelty whereby such objects are achieved will appear in the course of the following description.

In the accompanying drawings which form a part of the specification and are to be read in conjunction therewith, and in which like reference numerals are employed to indicate like parts in the various views.

Figure 3:
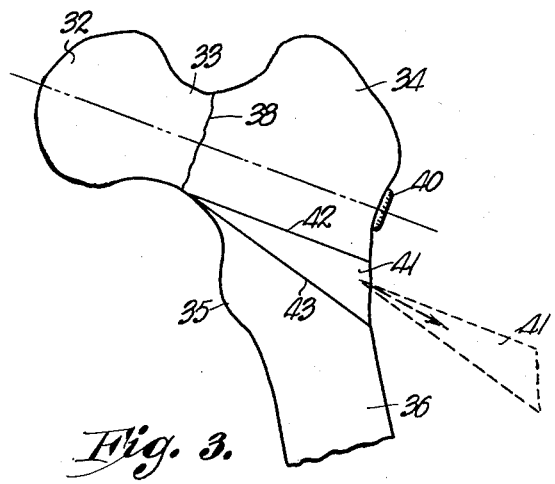
Fig. 3 is a similar view illustrating typical cuts made by the operating surgeon in a femoral trochanteric osteotomy.
Figure 4:
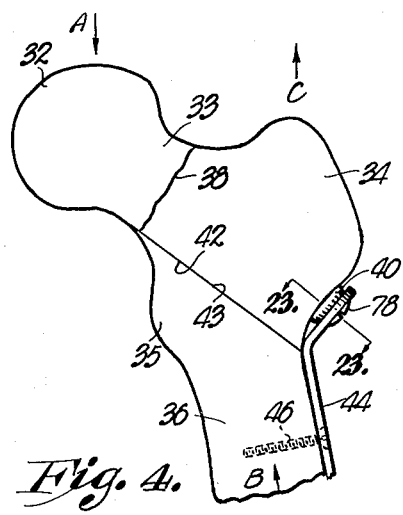
Figure 5:
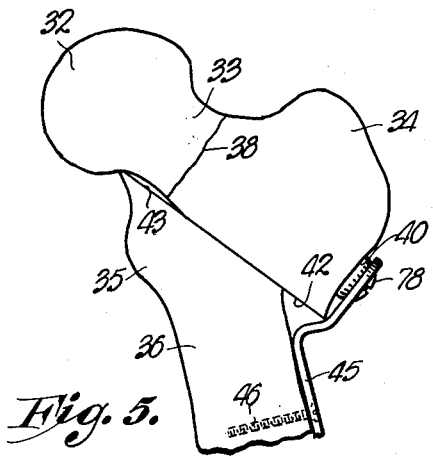

Figs. 4 and 5 are views showing by way of example two basic alternative manners in which the bone components can be relocated after the cuts illustrated in Fig. 3 have been made, the choice between the two lying with the operating surgeon and being determined by the condition of the patient, what the surgeon desires to achieve, and various factors; Fig. 4 represents an angulational osteotomy, while Fig. 5 represents an angulational-transpositional osteotomy. In each case an inter-trochanteric osteotomy plate formed according to the invention to fit the particular case is shown secured to the nail and the femoral shaft.

Fig. 6 is a view corresponding to Fig. 4 but showing in the place of the inter-trochanteric osteotomy plate, one form of gauge according to the invention, arranged in position to register the relationship of the relocated bone components preparatory to fashioning the plate to fit them; parts of the femur and nail are broken away for purposes of illustration and the gauge is shown partly in section and partly in elevation.

Figs. 7 and 8 are plan and side elevational views respectively of the inter-trochanteric osteotomy plate before bending thereof, the shape after bending for use in the osteotomy of Fig. 4 being indicated by the dotted lines in Fig. 8.

Fig. 9 is a plan view of the apparatus employed to bend the inter-trochanteric osteotomy plate for the Fig. 4 osteotomy, illustrating the mode of use of the tools.

Fig. 10 is a cross sectional view taken along the line 10—10 of Fig. 9 in the direction of the arrows.

Fig. 11 is a cross sectional view taken along the line 11—11 of Fig. 9 in the direction of the arrows.

Fig. 12 is an exploded perspective view of the gauge shown in Fig. 6.

Fig. 13 is a view corresponding to Fig. 5 but showing in place of the inter-trochanteric osteotomy plate another form of gauge I employ to register the relationship of the relocated bone components preparatory to fashioning the plate to fit them, the gauge being shown partly in section and partly in side elevation.

Figs. 14 and 15 are plan and side elevational views respectively of the inter-trochanteric osteotomy plate before bending thereof, the shape of the plate after bending for use in the Fig. 5 osteotomy being indicated by dotted lines in Fig. 15.

Fig. 16 is a plan view of apparatus employed to bend the inter-trochanteric osteotomy plate for the Fig. 5 osteotomy, illustrating the mode of use of the tools.

Fig. 17 is a fragmentary perspective view of one of the tools shown in Fig. 16.

Fig. 18 is an exploded perspective view of the gauge shown in Fig. 13.

Figure 19:
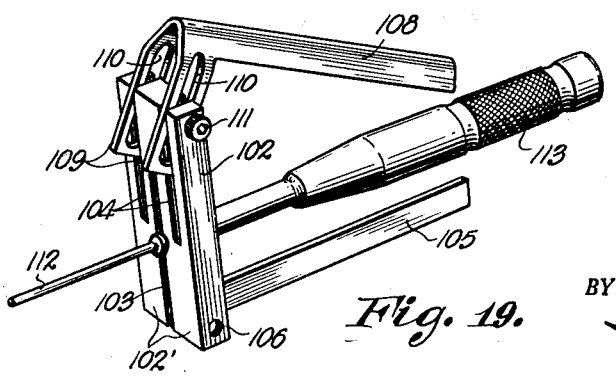

Fig. 19 is a perspective view of a modified form of gauge which may be used to register the position and relationship of the relocated bone components in an angulational osteotomy, a transpositional osteotomy, or an angulational-transpositional osteotomy.

Figure 20:
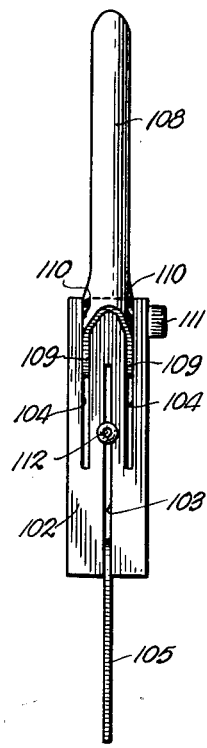

Fig. 20 is an edge elevational view of the combination gauge shown in Fig. 19.

Figure 21:
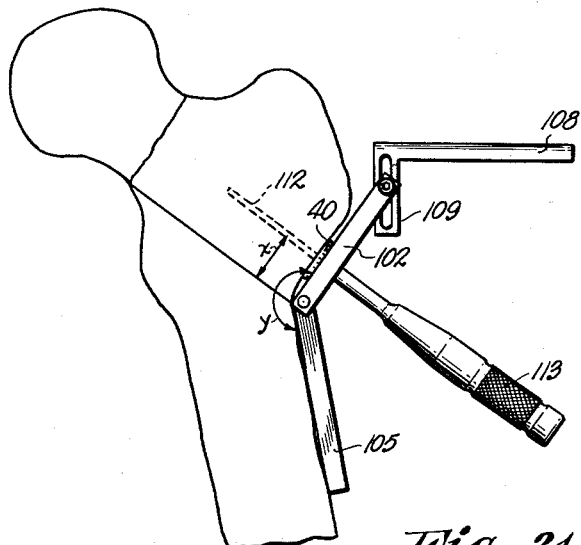
Figure 22:
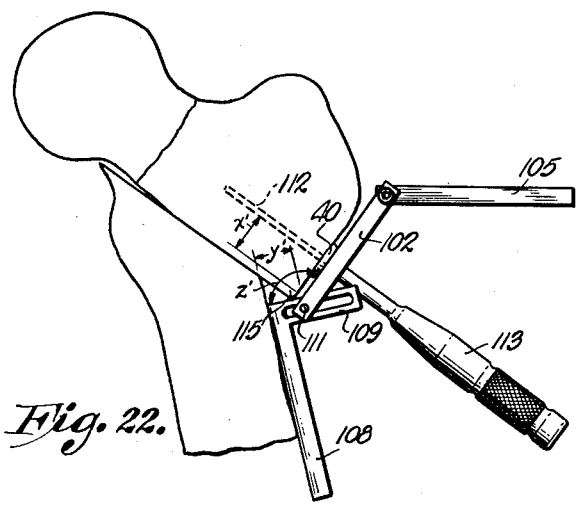

Figs. 21 and 22 are views illustrating the manner in which my combination gauge is used, Fig. 21 showing its use in an angulational osteotomy, and Fig. 22 showing its use in an angulational-transpositional osteotomy.

Fig. 23 is an enlarged cross sectional view taken along the line 23—23 of Fig. 4, in the direction of the arrows.

Fig. 24 illustrates an inter-trochanteric fracture of the femur, the bone components having been immobilized following an angulational osteotomy which involved removal of a bone wedge below the lesser trochanter to promote healing of the fracture.

Fig. 25 illustrates coxavera of the hip characterized by loss of the normal angle of the femoral head relative to the shaft, as may result from various causes.

Fig. 26 illustrates the correction of the Fig. 25 coxavera by an angulational osteotomy.

Fig. 27 illustrates coxavera accompanied by non-union or delayed union of a fracture in the femoral neck region, as may result from a number of causes.

Fig. 28 illustrates the correction of the condition shown in Fig. 27 by an angulational-transpositional osteotomy, the removal of the bone wedge serving to restore the femoral head to substantially its normal angular relationship to the shaft, and the medial transposition of the shaft serving to promote healing of the fracture and increase the stability of the hip joint.

Fig. 29 illustrates an arthritic hip joint characterized by loss of joint cartilage and fixed deformity of the femur relative to the pelvis.

Fig. 30 illustrates treatment of the condition shown in Fig. 29 by arthrodesis, or closure of the joint by a transfixation nail, and an angulational osteotomy (which may or may not be accompanied by shortening of the shaft) to correct the weight bearing alignment of the bone components.

Figure 1:
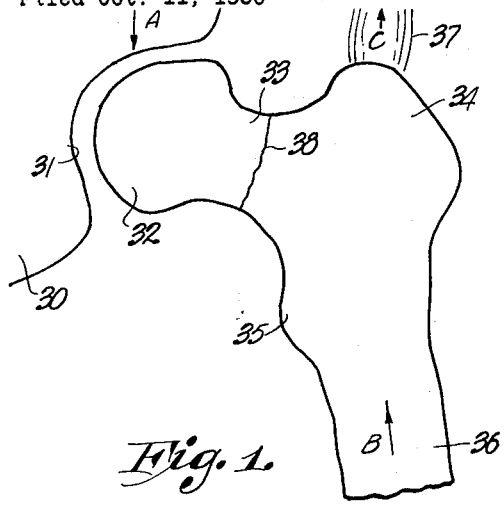
Fig. 1 is an elevational view of the upper extremity of a femur showing its relation to the pelvic bone and illustrating a common type of fracture amenable to trochanteric osteotomy.

Referring more particularly to Fig. 1, it will be helpful to outline briefly at the outset the principal physiologicoanatomical and gravitational factors that must be borne in mind in connection with a femoral trochanteric osteotomy. This figure illustrates the hip joint of the human skeleton, which comprises a pelvic bone 30 having a socket or acetabulum 31 that receives the ball-shaped head 32 of the femur, the capsular ligament that encloses their cartilaginous surfaces having been omitted for simplicity and clarity; proceeding from the head 32, the remaining portions of the femur shown are the neck 33, the greater trochanter 34, the lesser trochanter 35 and the femoral shaft 36 which, it will be understood, extends downwardly to the knee.

The hip joint is one of the units in the motor skeletal system which is capable of stability and a considerable degree of motion—a local manifestation of which is the phenomenon of movement of the individual or parts of him through space. In that phase of the normal gait when one foot is on the ground and the other is clear of the ground, the weight transmitted as a gravitational force to the body-supporting femur is represented by the arrow A. This force is met in the transverse neck-trochanteric region of the femur by an equal and opposite force B projected up the shaft 36 from the foot resting on the ground. Because the hip joint is spaced some 10 centimeters from the midline of the body, where body weight is centered, the effect of leverage makes these forces comparatively great; if body weight is 70 kg. for example, the effective thrust at A is a moment of 700 kg. cm.

Referring still to the weight-bearing side, the ball-shaped head of the femur is fixed and cannot move to any great extent due to its continuity with the ground. The pelvis cannot slip from the ball because the contour of the socket or acetabulum and ligaments form a stable carrier against such movement. Since the body weight is medial to the head of the femur, the socket therefore tends to rotate or revolve downwardly about the head of an arc, and the crest of the ilium on the weight-bearing side will rotate toward the spinal column. The individual would fall at this moment were it not for the spinal column shifting over the head of the femur to keep the center of gravity in line with the lower extremity. The righting reflexes are responsible for these latter movements which happen in the absence of a system of muscular checks to prevent the arc of the pelvis. One might then divide the gravitational force into two parts, one tending to thrust down on the head and neck of the femur with its counterpart from the shaft meeting it at the greater trochanter-neck region. The second part is a co-existing rotating, revolving, arcing force tending to swing the pelvis and acetabular socket downwardly about the head of the femur. The latter is opposed by still a third force C exerted principally by the gluteal muscles 37 which, by reason of their origin on the crest of the ilium (not shown) and insertion into the greater trochanter 34, resist rotation of the pelvis and keep the same level. The contralateral erector spinae, quadratus lumborum and the tensor fascia femoris on the same side as the gluteus medius and minimus assist the latter, but in the main the gluteal muscles are the principal resistors of the great gravitational force.

Figure 2:
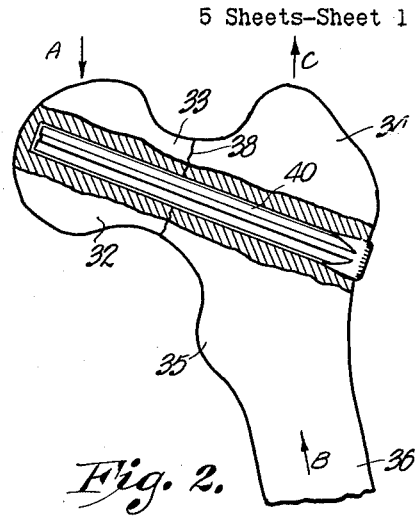
Fig. 2 is a view similar to Fig. 1, part of the femur being broken away to show in elevation the nail employed according to my invention.

The neck-trochanteric region is the crossroad where this triumvirate of forces meets, and because of its offset crane-like structural relationship with the shaft 36, this region is the most vulnerable, being the first to bend, dislocate or break. Since all of the forces both gravitational (weight-bearing) and anatomical (muscular) are operating in an integrated mechanism, it may be said that normal contour of the bone reflects the proper relationship in the distribution of these forces. Loss of continuity, shape and position, or loss of normal contour, reflects abnormalities of bone structure, abnormally great stress, or loss of soft tissue elements of the joint with consequent disruption of normal joint function instability, loss of motion and pain.

Where there has been an abnormal change in contour of the upper femur, indicating a malfunctioning joint, such for example as after certain types of fracture, this may sometimes be remedied simply by immobilizing the bone components in the correct normal anatomical position. For this there are many devices rigid in design and purpose. Assuming, for instance, that there is a fracture 38 relatively transverse to the axis of the neck 33, it is a common practice to drive axially into the neck, as shown in Fig. 2, a three flange nail 40 (commonly known in the profession as the Smith-Petersen nail) to immobilize the femural head relative to the trochanteric portion of theh femur. This may be all that is necessary, but often such is not the case. This is partly due to the fact that the nail extending through the neck quite obviously reduces the effective cross-sectional area of the neck so far as circulation of blood to the femoral head is concerned, and by thus impairing circulation retards the union of the bone components at the fracture zone. Added to this is the fact that the relationship of forces A, B and C to the transverse fracture 38 is such as to produce a strong tendency towards shear along the line of the fracture, these forces being capable of exaggerating greatly slight defects tending to disrupt the stability of the bone components meeting at the fracture line.

For these and other reasons it often is necessary or very desirable to rechannel the forces A, B and C in relation to the fracture in such a way as to utilize them to advantage in promoting rather than impairing the union of the bone components at the fracture. This, as well as the correction or other deformities as will be explained subsequently, is the function of osteotomy.

In any osteotomy five spacial changes in the bone components are possible, namely, angulation, transposition, rotation, shortening and lengthening. In the trochanteric neck region of the hip we are primarily concerned with the first two—angulation and transposition, and their combination, angulation-transposition. The next two—rotation and shortening—are incidental or coexisting movements most often associated with angulation and transposition, and rarely used for their effect alone. The last—lengthing—is a movement unassociated with the present problem so finds no place here.

Referring to Fig. 3, angulational osteotomy in the trochanteric neck region of the hip involves cutting from the femur a wedge 41, ordinarily by making cuts 42 and 43 between the lesser and greater trochanter, removing the wedge as indicated by dotted lines, and tilting the head-neck-greater-trochanter section to bring the cut surfaces 42 and 43 together as shown in Fig. 4. In a purely transpositional osteotomy (not illustrated) there would be no cut 43, but only a cut 42, the upper end of the shaft 36 being advanced laterally in a medial direction to lie under the fracture 38. Fig. 5 illustrates a combination angulation-transposition osteotomy; here in addition to removing the wedge 41 (Fig. 3) and tilting the head-neck-greater-trochanteric section (Fig. 4) the upper extremity of the shaft has been transposed to the left so that it lies under the fracture.

Referring to Figs. 4 and 5, it will be seen that the angulational shift of the head-neck-trochanteric section of the femur makes the fracture site more horizontal relative to the shaft 36, thereby decreasing the effect of shear along the fracture and enhancing the effect of compression between the fragments on either side of the fracture site; in other words, forces A and B have been rechanneled to favor healing instead of disrupting the fracture. Where the femoral shaft is moved under the head and neck, as in the case of a purely transpositional osteotomy, or in a combination transpositional-angulational osteotomy (Fig. 5) the weight-bearing stresses bypass the femoral neck, and to a large degree the fracture, so that it is only the static muscle pull on the greater trochanter (force F) which has any substantial disruptive effect upon the fracture. Transposition also amounts in effect to a bone graft between the upper extremity of the femoral shaft and the femoral head and neck which tends to augment the precarious blood supply in the head and neck, enhancing vacularity and healing of the bone.

Once the operation has been completed (i. e., when the necessary cuts have been made and the bone components relocated) it is necessary that they be fixed or immobilized for a period sufficiently long for them to heal. Otherwise, the normal anatomical force C, even in the absence of weight bearing, due to static muscle pull will disrupt the bone components. Disruption can occur in a plaster cast, the most common type of external immobilization used in these cases. A salient feature of the present invention resides in the provision of an inter-trochanteric osteotomy plate or external splint (identified by the numeral 44 in Fig. 4 and by the numeral 45 in Fig. 5) bridging the osteotomy site with one end secured to the nail 40 and the other end secured by screws 46 to the femoral shaft.

The difference in the shape of plates 44 and 45, as shown in Figs. 4 and 5, illustrates the variation that may exist even in the same femur with the same cuts, depending upon whether there is angulation only or a combination of angulation and transposition. In actual practice the position of the cuts may also depart widely from the positions shown, in accordance with what the surgeon wishes to do and what he finds in the course of the operation he is capable of doing. Taking these factors, plus the inevitable variation in shape and contour between one femur and another, it can well be appreciated that the requirements as to the shape of the inter-trochanteric splint rarely are alike in any two cases. Therefore an important phase of my invention resides in being able to form an inter-trochanteric osteotomy plate or splint very rapidly in the course of any operation to fit the situation in hand. The means I have provided for doing this now will be explained.

In the case of an angulational osteotomy, I first employ a gauge as shown in Figs. 6 and 12 to analyze and accurately register the position of the bone components after they have been relocated as desired by the operating surgeon. This gauge comprises a block 50 split longitudinally to form a slot 51 extending inwardly from one end of the block to a point near the opposite end. Between the legs thus formed is a thin flat blade or arm 52 apertured at one end to receive a pivot screw 53 extending through a hole 54 in one leg of the block into an internally threaded corresponding hole in the opposite leg. The head of the screw is knurled to facilitate turning same; when tightened it causes the legs of the block to securely clamp the arm 52 and thus prevent movement of the latter, but when loosened the blade can swing freely on the screw.

In the slot 51 is threaded shank 55a of an elongated pin 55 having an enlarged integral collar 55b intermediate the two sections of the pin. This collar is disposed in a shallow recess 56 in one face of the block and forms a shoulder abutting the bottom of the recess. The shank of the pin is threaded but is flattened on two opposite sides as best seen in Fig. 12 so that the shank will slide longitudinally of slot 51 but cannot turn therein about its own axis. A knurled thumb-nut 57 is screwed onto the end of the threaded shank 55a which projects out of slot 51. When the nut is loosened the pin can be shifted longitudinally of the slot as suggested above, but when it is tightened it clamps the pin securely to the block.

Referring to Fig. 6 the nail 40 which I employ is cannulated to receive pin 55, the outermost end of its bore also being specially threaded to facilitate subsequent attachment of the inter-trochanteric osteotomy plate thereto, as will be explained more fully hereinafter. In using my gauge, nut 57 and screw 53 first are loosened; pin 55 then is inserted into the bore of nail 40 and, with the face of block 50 pressed firmly against the end of the nail, the block is shifted longitudinally until blade 52 will lie flat against the femoral shaft 36 as shown. With the parts thus positioned, nut 57 and screw 53 are tightened, after which pin 55 is withdrawn from the nail.

It should be noted that the gauge now offers a fixed and properly integrated registration of the two variables which will control the fashioning of the inter-trochanteric osteotomy plate 44 (Fig. 4)—namely, the size of the angle $x$ that exists between the side of the femoral shaft 36 and the plane of the exposed end of nail 40 and, second, the distance $y$, this being the distance from the axis of the nail 40 to the point at which the bend in the plate must occur.

In forming my inter-trochanteric osteotomy plate, I use the tools illustrated in Figs. 9, 10 and 11. These comprise a pair of elongated bars 60 and 61 of rectangular cross section, each bar being grooved longitudinally to provide a narrow but rather deep slot 62 extending inwardly from one end of the bar; the latter end has a pair of opposed, tapered or bevelled surfaces 63 disposed at an angle of 45° to the axis of the bar, forming what will be referred to hereinafter as the nose of the bar.

Bar 60 has secured thereto on one side of the slot 62 a plate 65 bearing a protractor scale 66. At the center of this scale is a pivot pin 67 carrying an arm 68 which may be clamped against movement by tightening a knurled nut 69 screw threadedly received on the pivot pin, or allowed to turn about the pin by loosening said nut. The arm has a sight aperture 70 over the protractor scale, this having in one edge an index lined 71 adapted to register with the markings on the scale; on the other side of the pivot the arm is formed with an L-shaped leg having a second index line 72 adapted to function similarly.

For all femoral trochanteric osteotomies, regardless of the final disposition of the bone components, I fashion my inter-trochanteric osteotomy plate utilizing a standard, preformed flat plate which is shaped, drilled and counterbored as shown by solid lines in Figs. 7 and 8. The manner in which this is bent in the case of an angulational osteotomy now will be described, it being assumed for purposes of explanation that the bone components have been relocated as shown in Fig. 6 following removal of a bone wedge, and that the gauge also shown in that figure has been set as described hereinbefore to measure the angle $x$ and the distance $y$.

First, it is necessary to locate the point at which the flat osteotomy plate must be bent, and I prefer to lightly scribe a pair of parallel lines 74 across the plate, marking the region between which the bend must occur. The location of these lines is determined by measuring the distance $y$ on the gauge (by calipers or in any other suitable fashion) and then measuring off a like distance longitudinally of the plate from the center of hole 75 to fix the position of lines 74; with very little experience the operating surgeon can make appropriate allowance for the radius of the bend and the thickness of the plate in locating lines 74 based upon the measured distance.

Next, the angle $x$ on the gauge is measured (for instance by a protractor) and arm 68 is set at a similar angle with the aid of the protractor scale 66 and index line 71. The flat plate 44 now is inserted in slots 62 or bar 60 and 61 with the nose ends of the respective bars lying on either side of lines 74; and bar 61 is swung up to a position paralleling arm 69 (see Fig. 9), bending plate 44 at the proper place and at the proper angle to fit the osteotomy at hand. When the plate now is positioned as shown in Fig 4, it is only necessary for the surgeon to secure it to the femoral shaft by screws 46 extending through the preformed holes 76 (see Fig. 7) and anchor it to the cannulated transfixation nail 40 which already is in place extending axially through the femoral neck.

It will be convenient at this point to refer to Fig. 23 which shows the form of connection I prefer to employ between the transfixation nail 40 and the inter-trochanteric osteotomy plate 44. It will be noted that the end of the nail is internally threaded at 77 to receive a hollow screw 78 extending through hole 75 in the plate; and it is further threaded at 79 to receive a lock screw 80 extending through the bore of screw 78. Screw 78, which is tightened down first, may have a right-hand thread, while screw 80 has a left-hand thread (or vice versa) so that when the two are in place it is virtually impossible for screw 78 to work loose.

The head of screw 78 is countersunk, being tapered to fit the counterbored face 82 of plate 44. The outermost extremity of nail 40 is similarly tapered to seat in a counterbore 83 in the opposite face of the plate. Preferably the confronting or seating faces of the nail and counterbore 83 are roughened or provided with radial serrations to positively prevent rotation of the nail about its axis when the two members are drawn tightly together, so it will be seen that my arrangement forms an exceedingly strong and secure connection between the two members, which in effect integrates them as one permanently rigid unit.

Referring then to Fig. 4, it can be appreciated that the bone components are firmly braced and anchored by my arrangement so that they will remain fixed through the post-operative healing period. Moreover, because the inter-trochanteric osteotomy plate has been accurately fashioned to fit the particular situation at hand, it is easily tolerated by the patient and the relationship in which the bone components are maintained is the best suited to promote healing.

Let it now be supposed that the osteotomy involves, instead of angulation of the bone components (or in addition thereto) transposition of the upper end of the femoral shaft along the femoral neck in a medial direction. In such a case I may use a gauge of the kind shown in Figs. 13 and 18. Referring to the latter figure, the gauge comprises a block 85 having near one end thereof a pin 86 projecting from one longitudinal face of the block at right angles thereto, the pin being secured to the block by a set screw 87. A slot 88 extends inwardly from the opposite end of the block forming opposed legs 89. Between these legs is a thin, flat blade 90 having a right angle projection 90' at the end thereof; a thumb screw 91 passing through an aperture 92 in one of said legs into a tapped hole in the opposite leg makes it possible to draw the legs together in order to clamp the blade, which, it will be understood, is freely slidable in slot 88 when the screw is loosened.

The manner in which this gauge is used will be evident from Fig. 13. With screw 91 loosened, pin 86 simply is inserted into the bore of the cannulated nail 40 and block 85 is pressed firmly against the exposed end of the nail. Blade 90 next is moved in the slot so that its edge abuts again the corner 93 of the upper bone segment while the portion 90' lies against the distal side of the femoral shaft as shown; then screw 91 is tightened to preserve the position of the blade relative to the block and the gauge is withdrawn.

Referring to Figs. 14 and 15, I now scribe two pairs of lines 94 and 95 on the preformed, flat osteotomy plate 45 to be used, in order to mark the two places at which the plate must be bent. The position of lines 94 is determined from the gauge by measuring the distance $x'$ (i. e., the distance from the center of pin 86 to the corner 96 formed by the block 85 and blade 90—see Fig. 13) while the position of lines 95 is determined from the gauge by measuring the distance $y'$ (i. e., the distance from corner 96 to the end of blade 90).

Using the tools illustrated in Figs. 9, 10 and 11, in the manner previously described, plate 45 next is bent in the region between lines 94; in doing this, arm 68 of the bar 60 is set to conform with the angle $z'$ measured from the gauge, so, as shown in Fig. 15, the initial bend in plate 45 will cant the tip of the plate at the angle $z'$ relative to the main body of the plate.

It now is necessary to form a 90° bend in plate 45 between lines 95, and for this purpose I use, in conjunction with bar 60 or bar 61, another bar-like tool 97 shaped as shown in Figs. 16 and 17. This has a nose 98 at 45° to the longitudinal axis of the bar, and at the junction of the nose and one side of the bar, a narrow slot 99 extends transversely inward to an open pocket 100. It will be noted that the forward wall of the slot is coplanar with the forward wall of the pocket and in fact forms an extension thereof, the tip of the bar being shaped as a right triangular prism. The canted end of plate 45 is placed in pocket 100 with the straight portion of the plate projecting through slot 99 and extending laterally from the bar; the projecting portion is inserted in slot 62 of bar 60 or bar 61, whichever may be more convenient. With the nose of the latter bar and the confronting longitudinal face of bar 97 positioned on either side of the lines 95 and closely adjacent thereto, bar 97 is swung through 90° or until its nose 98 parallels the nose surface 63 of bar 60 (or 61) as shown in Fig. 16, which forms a 90° bend in plate 45 at the proper location.

With the plate thus bent at the two places determined by the distances, $x'$ and $y'$, it will accurately fit the re-located bone components as shown in Fig. 5. When it is connected to the transfixation nail 40 by the lock screw arrangement discussed in connection with Fig. 23, and is secured to the distal side of the femoral shaft by screws 46, it forms a fixation unit which anchors and supports the bone components rigidly in the position selected by the surgeon.

Although Figs. 5 and 13 illustrate an osteotomy involving both angulation and transposition, it will be understood that the same gauge would be employed in a purely transpositional osteotomy (i. e., one not involving removal of a bone wedge) and also that the same basic method would be followed in bending the inter-trochanteric osteotomy plate, but the final shape of the plate naturally would be different due to the differences that would exist in the measured distances $x'$ and $y'$ and in the angle $z'$.

Figs. 19 to 22 illustrate a modified form of gauge which is suitable for registering the necessary angles and distances involved in any femoral trochanteric osteotomy whether the osteotomy involves angulation alone, transposition alone, a combination of angulation and transposition, or any of the foregoing in combination with shortening and/or rotation. This gauge comprises a block 102 having a slot 103 extending inwardly from one end and a pair of slots 104 extending inwardly from the opposite end, the latter lying on either side of the first-mentioned slot. In the slot 103 at one end of the block is a thin blade 105 apertured to receive a pivot screw 106 extending transversely of the block; this screw preferably is tightened down sufficiently to cause the legs 102' to exert some frictional force on the sides of the blade without tightly binding it, the blade therefore being manually movable by light finger pressure but being adapted to remain in any position to which it is thus moved.

At the opposite end of the block is a channel member or finger 108. U-shaped in transverse cross section, this has at one end a pair of integral, laterally spaced parallel legs 109 disposed at right angles to the longitudinal axis of the finger. The latter legs are disposed in slots 104 and each has an elongated aperture 110 through which the shank of a thumb screw 111 extends. When the screw is loosened it will be seen that legs 109 can slide freely in slots 104 and turn about the screw, but when it is tightened they are clamped against such movement.

A pin 112 which is substantially identical to pin 55 (Fig. 12) has its flattened shank extending through slot 103; the threaded end of this shank projects beyond block 102 and is screwed into tapped hole in the end of handle 113. Thus when the handle is tightened, pin 112 is clamped securely to block 102 and cannot move, but when it is loosened, the pin may be shifted longitudinally of the slot.

The manner in which this gauge is used in the case of an angulational osteotomy is illustrated in Fig. 21. With handle 113 loosened slightly, pin 112 is inserted in the bore of the cannulated nail 40; blade 105 is positioned toward the femoral shaft and block 102 is adjusted in an endwise direction until it and the blade 105 occupy the positions shown. Then handle 113 is tightened and used to withdraw the gauge which, it will be seen, now registers the distance $x$ and the angle $y$ so that on the basis of these measurements the surgeon can bend the flat osteotomy plate to fit the relocated bone components as described hereinbefore.

In the case of a transpositional osteotomy or an angulational-transpositional osteotomy, the gauge is used as shown in Fig. 22. Here again finger 112 is inserted in the cannulated nail with handle 113 slightly loosened. Screw 111 also is loosened and the gauge parts are adjusted to the position shown, wherein finger 108 lies along the distal side of the femoral shaft, legs 109 abut the corner 115 of the upper bone segment and block 102 is tight against the end of the nail 40. Then screw 111 and handle 113 are tightened and the latter is used to remove the gauge with the parts thus set in proper position. In bending the inter-trochanteric osteotomy plate, the surgeon uses measurements of the distances $x'$ and $y'$ and the angle $z'$ as previously described.

From the discussion and explanation which has been given above, it should be clear to those versed in the art how my invention is adapted, without any fundamental departure from the principles disclosed, to meet the many varying situations that may be encountered in practice. A few representative conditions that have been treated according to the invention are illustrated in Figs. 24 to 30.

Fig. 24 shows an inter-trochanteric fracture 120 which has been immobilized by the transfixation nail 40. To reduce the tendency toward shear along the fracture line, and to utilize the gravitational and anatomical forces to promote healing, an angulational osteotomy has been performed; that is to say, a bone wedge 121 has been removed to increase the pitch angle of the femoral head-neck region and make the fracture more nearly horizontal. It will be understood that in this case, as in the others discussed, the angulational osteotomy may be accompanied by shortening or rotation if such is desirable or necessary; if shortening is involved, the removed bone wedge might, for example, take the shape 121'.

Fig. 25 illustrates coxavera or loss of the normal angle of the crane-like upper portion of the femur, which results in a drooping femoral head. Such an abnormal condition (which may have various causes) is corrected by removing a wedge 122 and, by means of my invention, relocating the bone components as shown in Fig. 26, so that approximately the normal angle of the head is restored.

Fig. 27 shows coxavera accompanied by non-union or delayed union of an old fracture 123 in the femoral-neck region. As a remedial measure, an angulational-transpositional osteotomy is performed as shown in Fig. 28, the transfixation nail 40 being driven through the femoral neck across the fracture zone and a bone wedge 124 being removed to restore the head to approximately its normal angle; the medial transposition of the femoral shaft helps to stabilize the joint and promotes healing by augmenting the blood supply and, in effect, forming a bone graft bridging the fracture.

Fig. 29 illustrates an arthtritic hip joint which may be treated by arthrodesis as shown in Fig. 30. As indicated, the femoral head is rigidly fixed in the acetabular socket by driving a transfixation nail 40 axially through the femoral neck and into the pelvic bone. To correct the fixed deformity of the femur relative to the pelvis and improve weight bearing alignment, an angulational osteotomy is performed, that is to say, wedge 125 is removed and the bone components relocated as shown in Fig. 30.

In each of the foregoing operations, my flat, intertrochanteric osteotomy plate is bent to fit the particular need, using the gauges and bending tools described hereinbefore. The flexibility of my apparatus makes it possible in any such operation to fashion the requisite plate rapidly and accurately in the course of the operation, and insures proper immobilization of the bone components whatever their contour may be and whatever final position they may occupy.

From the foregoing it will be seen that this invention is one well adapted to attain all of the ends and objects hereinbefore set forth, together with other advantages which are obvious and which are inherent to the invention.

It will be understood that certain features and sub-combinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. An osteotomy gauge for use with a femur having a cannulated transfixation nail extending axially of the femoral neck, comprising a pin adapted to be advanced axially into the bore of said nail, an enlarged body carried by said pin and having normal to the pin a flat face adapted to engage the end of the nail and limit the advance of the pin into the nail, and an arm carried by said body and angularly adjustable thereon relative to the plane of said face to lie longitudinally along the distal side of the femoral shaft when said pin is in said nail and said body is against the end of the nail.

2. An osteotomy gauge for use with a femur having a cannulated, transfixation nail extending axially of the femoral neck, comprising a pin adapted to be advanced axially into the bore of said nail, an enlarged body carried by said pin and having normal to the pin a flat face adapted to engage the end of the nail and limit the advance of the pin into the nail, an arm carried by said body and angularly adjustable thereon relative to the plane of said face to lie longitudinally along the distal side of the femoral shaft when said pin is in said nail and said body is against the end of the nail, and means for locking said arm immovably to said body in adjusted position.

3. An osteotomy gauge for use with a femur having a cannulated transfixation nail extending axially of the femoral neck, comprising a slender pin of generally circular cross section adapted to be advanced axially into the bore of said nail, an enlarged body carried by said pin and having normal to the pin a face adapted to engage the end of the nail and limit the advance of the pin into the nail, a rigid L-shaped member having one leg mounted on said body, said one leg being angularly adjustable relative to said face and at any angle being adjustable in the direction of its own axis whereby the transverse leg of said member can be positioned to lie longitudinally along the distal side of the femoral shaft when said pin is in said nail and said body is against the end of the nail.

4. A gauge as in claim 3 wherein said legs of said L-shaped member are at right angles to one another.

5. An osteotomy gauge for use with a femur having a cannulated transfixation nail extending axially of the femoral neck, comprising a slender pin of generally circular cross section adapted to be advanced axially into the bore of said nail, an enlarged body carried by said pin and having normal to the pin a face adapted to engage the end of the nail and limit the advance of the pin into the nail, a rigid L-shaped member having one leg mounted on said body, said one leg being angularly adjustable relative to said face and at any angle being adjustable in the direction of its own axis whereby the transverse leg of said member can be positioned to lie longitudinally along the distal side of the femoral shaft when said pin is in said nail and said body is against the end of the nail, and means for locking said member immovably to said body in adjusted position.

6. An osteotomy gauge of the character described comprising a body having a flat face, an arm pivoted to said body to swing about an axis parallel to said face, a pin carried by said body and projecting therefrom normal to said face, said pin movable along said face toward and away from said axis thereby to adjust the spacing between said pin and said axis, and means for locking said pin in adjusted position.

7. An osteotomy gauge of the character described comprising a body having a flat face, an arm pivoted to said body to swing about an axis parallel to said face, means optionally operable to immobilize said arm relative to said body in any desired angular relationship, a pin carried by said body and projecting therefrom normal to said face, said pin movable along said face toward and away from said axis thereby to adjust the spacing between said pin and said axis, and means for locking said pin in adjusted position.

8. An osteotomy gauge of the character described comprising a body having a flat face, a rigid L-shaped member having one leg connected to said body for rotation and longitudinal movement relative to a fixed axis parallel to said face, a pin carried by said body and projecting therefrom normal to said face, said pin movable along said face toward and away from said axis thereby to adjust the spacing between said pin and said axis, and means for locking said pin in adjusted position.

9. An osteotomy gauge of the character described comprising a body having a flat face, a rigid L-shaped member having one leg connected to said body for rotation and longitudinal movement relative to a fixed axis parallel to said face, means optionally operable when said member is in any position to lock same against a change in its position relative to said body, a pin carried by said body and projecting therefrom normal to said face, said pin movable along said face toward and away from said axis thereby to adjust the spacing between said pin and said axis, and means for locking said pin in adjusted position.

10. An osteotomy gauge of the character described comprising a body having a flat face, a pivot pin carried by said body parallel to said face, a rigid L-shaped member having an elongated hole in one leg thereof to receive said pin whereby said leg is rotatable and axially movable about said pin, a second pin carried by said body and projecting therefrom normal to said face, said pin movable along said face toward and away from said first pin thereby to adjust the spacing between said pins, and means for locking said second pin in adjusted position.

11. An osteotomy gauge of the character described comprising a block having a slot extending longitudinally inward from one end and dividing the block into a pair of opposed legs, a pivot member bridging said slot and carried by said legs, a flat blade in said slot apertured to receive said pivot member whereby it is adapted to swing about said member, means including said pivot member for drawing said legs together to clamp said blade, an elongated pin disposed transverse to the length of said slot and having a shank portion in said slot, said shank portion of the pin being shiftable in said slot toward and away from said pivot member, and means optionally operable to secure said shank portion of the pin immovably to said block in any selected position along said slot.

12. An osteotomy gauge of the character described comprising an elongated body having a flat face, a pair of pivot pins carried by said body at the opposite ends thereof, each of said pins being parallel to said face, an arm pivotally mounted on one of said pins to swing in an arc about said pin as a center, a rigid L-shaped member having in one leg thereof an elongated aperture to receive the other pin whereby said one leg is rotatable and axially movable on said other pin, said body carrying a third pin projecting therefrom normal to said face at a position intermediate said first two pins, said third pin adjustable longitudinally of said body to vary the spacing between same and the respective ends of said body, and means for securing said third pin to said body in any adjusted position.

13. An osteotomy gauge of the character described comprising a body, the opposite sides of which are flat parallel faces, an arm pivoted to said body to swing about an axis parallel to each of said faces, said body having a slot extending therethrough from one of said faces to the other, said slot being elongated in a direction normal to said axis, a pin having a shank portion received in said slot, a pair of enlarged shoulder elements on said pin engaging opposite ones of said faces to maintain the pin normal to said faces while allowing movement of said shank longitudinally of the slot toward and away from said axis, one of said shoulder elements being adjustable axially of the pin at will to clamp said body between the two elements and thereby restrain said pin against movement longitudinally of the slot.

14. An osteotomy gauge of the character described comprising a body, the opposite sides of which are flat parallel faces, a rigid L-shaped member having one leg connected to said body for rotation and longitudinal movement relative to a fixed axis parallel to each of said faces, said body containing a slot extending therethrough from one of said faces to the other, said slot being elongated in a direction normal to said axis, an elongated pin having a shank portion received in said slot, a pair of enlarged shoulder elements on said pin engaging opposite ones of said faces to maintain said pin normal thereto while permitting it to slide longitudinally of the slot toward and away from said axis, one of said shoulder elements being adjustable longitudinally of the pin at will to clamp said body between the two shoulder elements and thereby restrain the pin from movement in said slot.

References Cited in the file of this patent

UNITED STATES PATENTS

| | | |
|---|---|---|
| 964,785 | Johnson | July 19, 1910 |
| 975,268 | Montague | Nov. 8, 1910 |
| 1,408,085 | Garratt et al. | Feb. 28, 1922 |
| 1,691,279 | Gates | Nov. 13, 1928 |
| 1,935,055 | Morgan | Nov. 14, 1933 |
| 2,200,120 | Nauth | May 7, 1940 |
| 2,441,765 | Hopkins | May 18, 1948 |

OTHER REFERENCES

The Journal of Bone and Joint Surgery for April 1943, pp. 319–339; The Journal of Bone and Joint Surgery for Oct. 1948, pp. 1008–9. (Originals in the Scientific Library, copies in Div. 55.)